UNITED STATES PATENT OFFICE.

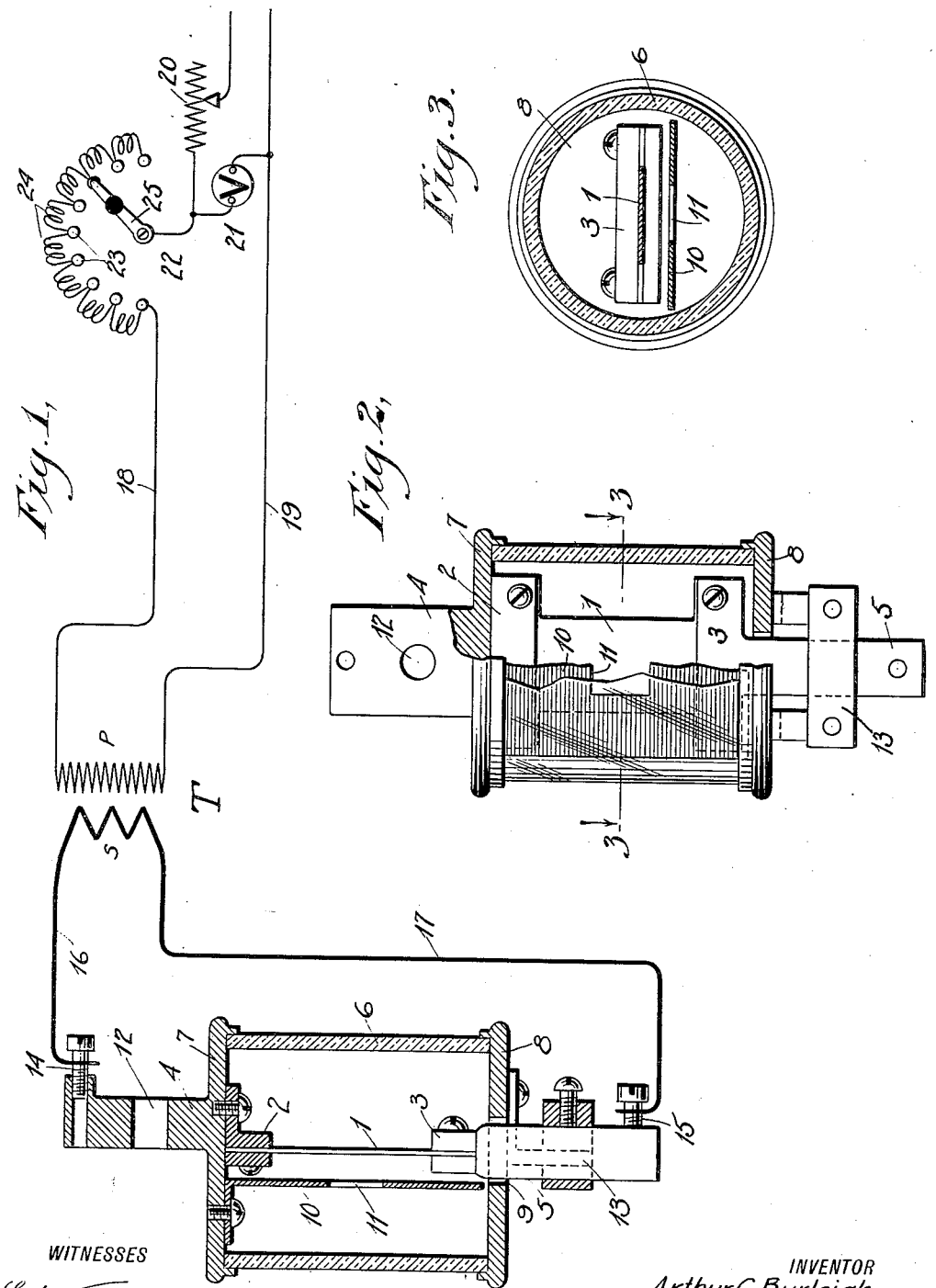

ARTHUR CILLEY BURLEIGH, OF SEWICKLEY, PENNSYLVANIA.

OPTICAL PYROMETER.

1,119,571.  Specification of Letters Patent.  Patented Dec. 1, 1914.

Application filed September 3, 1914. Serial No. 859,996.

*To all whom it may concern:*

Be it known that I, ARTHUR C. BURLEIGH, a citizen of the United States, and a resident of Sewickley, in the county of Allegheny and State of Pennsylvania, have invented a new and Improved Optical Pyrometer, of which the following is a full, clear, and exact description.

This invention relates to measuring instruments, and deals more particularly with pyrometers of the optical type especially adapted for ascertaining the color of metal at various temperatures, the instrument being especially adapted for use in heat treatment laboratories, as it can be placed adjacent the furnace and the temperature of the work therein determined by color comparisons between the work treated and indicator of the pyrometer, although the instrument is useful in classroom work, whereby an instructor in metalworking can demonstrate to the students the exact color of the heated metal at various temperatures.

The invention has for its general objects to provide an improved indicator which is heated by the passage of current therethrough, which can be regulated for various temperatures, whereby the color of the heated metal can be effectively demonstrated, the indicator including means for holding a strip of metal which can be heated and reheated at high temperatures without changing its physical properties and without oxidizing, and in front of this strip is a shield having a small aperture directly in line with the center of the strip so as to expose the most evenly heated portion thereof, and surrounding the metal strip and shield is an inclosing cylinder of glass to protect the heated strip from air currents and at the same time allowing the heat to escape.

For a more complete understanding of the invention, reference is to be had to the following description and claims taken in connection with the accompanying drawing, wherein similar reference characters indicate corresponding parts in all the views, and in which—

Figure 1 is a vertical section of the indicator, showing the same in connection with a circuit diagram; Fig. 2 is a front view of the indicator with portions broken away; and Fig. 3 is a horizontal section on the line 3—3, Fig. 2.

Referring to the drawing, 1 designates a flat strip of any suitable metal which can be repeatedly heated without oxidizing or changing its physical properties, and this is mounted with its ends in clamps 2 and 3, respectively, which are electrically connected with large brass terminal elements 4 and 5. The strip 1 is mounted within a glass cylinder or equivalent housing 6 which protects the metal strip from air currents and keeps the surrounding conditions practically constant, the cylinder being provided with heads 7 and 8, of which the formed is made a part of the terminal 4. The terminal 5 extends through an opening 9 in the lower head 8, the opening being large enough to provide for ventilation. Within the casing and positioned in front of the strip 1 is a metal or other shield 10 that has an opening 11 of about three-quarters of an inch in diameter that is directly in front of the center of the strip 1, as the center of the said strip is the more evenly heated portion thereof, and it is through this opening 11 that the strip is exposed for observation. The upper terminal 4 has an opening 12 for receiving a suitable fastening whereby the indicator is secured to a panel or other support, and a bracket 13 is applied to the lower terminal, and by means of it the lower part of the indicator is fastened to a supporting panel. The lower head 8 may be supported by this lower bracket 13. The terminals 4 and 5 are provided with screws or equivalent means 14 and 15 that serve as binding posts for connecting the indicating device in the secondary circuit of the pyrometer apparatus.

In using the indicator a transformer T is employed to step down the voltage. The secondary $s$ consists of about two ampere turns and is connected by copper bars or the like indicated by 16 and 17, with the terminals 4 and 5. For a primary supply circuit of one hundred and ten volts, the primary winding $p$ will have about three hundred and fifty ampere turns, and the terminal of this winding is connected with the conductors 18 and 19. In the side of the circuit 18 there is an adjustable resistance 20 whereby the line voltage can be reduced to one hundred and five volts for allowing of an adjustment for low line voltage and making it possible to keep a constant applied voltage. In association with the resistance a volt meter 21 is connected across the two sides of the circuit for ascertaining the voltage. A rheostat 22 is employed in connection with the circuits and it has a suitable number of contacts 23 for connection with the sections of the divided resistance 24, and coöperating with this series of contacts 23 is a movable contact 25 whereby different voltages can be obtained to ascertain the color of the heated element 1 at various temperatures. The contacts or buttons 23 will be labeled for different degrees of heat.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A pyrometer including an indicator, consisting of terminal elements, a metal strip fastened thereto for heat color indications, an inclosing casing therefor having a transparent wall, and a shield provided with an opening exposing a portion of the said strip.

2. A pyrometer including an indicator consisting of terminal elements, a metal strip for heat color indications, means for clamping the strip to the terminal pieces, an inclosing casing having a transparent wall, a shield disposed within the casing and provided with an opening in line with the center of the said strip, and means for supplying current to the terminal pieces.

3. An indicating device comprising a strip of metal for heat color indications, means for connecting the strip to a source of current, an inclosing casing, and a shield therein having an opening through which a portion of the strip is exposed.

4. A pyrometer indicator comprising a terminal piece formed with a head, a glass cylinder having one end closed by the head, a head for the other end of the cylinder and provided with an opening, a terminal piece extending into the opening, an element heated to different colors by current, means for connecting the same to the terminal pieces, and a shield within the cylinder fastened to one of the heads, said shield having an opening for exposing the central portion of the said element.

In testimony whereof I have signed my name to this specification in the presence of two subscribing witnesses.

ARTHUR CILLEY BURLEIGH.

Witnesses:
CARLETON WARREN,
C. D. MORRISON.